(12) United States Patent
Zeng et al.

(10) Patent No.: US 10,020,023 B2
(45) Date of Patent: Jul. 10, 2018

(54) METHOD, APPARATUS AND SYSTEM FOR PLAYING AUDIO SYNCHRONOUSLY

(71) Applicant: GOERTEK INC., Weifang, ShanDong Province (CN)

(72) Inventors: Xiaobo Zeng, Weifang (CN); Chongle Wang, Weifang (CN); Qiang Gao, Weifang (CN)

(73) Assignee: Goertek Inc., Welfang, ShanDong Province (CN)

( * ) Notice: Subject to any disclaimer, the term of this patent is extended or adjusted under 35 U.S.C. 154(b) by 0 days.

(21) Appl. No.: 15/310,000

(22) PCT Filed: Sep. 7, 2015

(86) PCT No.: PCT/CN2015/089042
§ 371 (c)(1),
(2) Date: Nov. 9, 2016

(87) PCT Pub. No.: WO2016/041445
PCT Pub. Date: Mar. 24, 2016

(65) Prior Publication Data
US 2017/0270962 A1    Sep. 21, 2017

(30) Foreign Application Priority Data
Sep. 18, 2014  (CN) .......................... 2014 1 0479022

(51) Int. Cl.
*G11B 20/10* (2006.01)
*H04N 21/262* (2011.01)
(Continued)

(52) U.S. Cl.
CPC ........ *G11B 20/10527* (2013.01); *G06F 3/165* (2013.01); *G06F 17/30044* (2013.01);
(Continued)

(58) Field of Classification Search
CPC .. H04N 21/20; H04N 21/25; H04N 21/26258; G06F 17/30017;
(Continued)

(56) References Cited

U.S. PATENT DOCUMENTS 7,539,551 B2 * 5/2009 Komura .................... H04S 1/00
                                                              700/94
9,055,332 B2 * 6/2015 Westin ............. H04N 21/23424
(Continued)

FOREIGN PATENT DOCUMENTS

CN       101202568      6/2008
CN       102739661      10/2012
(Continued)

OTHER PUBLICATIONS

International Search Report from the State Intellectual Property Office of the P.R. China for International Application No. PCT/CN2015089042, dated Dec. 16, 2015.
(Continued)

*Primary Examiner* — Jesse A Elbin
(74) *Attorney, Agent, or Firm* — Leydig, Voit & Mayer, Ltd.

(57) ABSTRACT

The present invention discloses a synchronized audio playing method, apparatus, and system for playing audio synchronously. By outputting designated data using a designated data buffer area before arrival of the starting time point of synchronous playing so as to make an audio link in a stable state, the method shuns from the impact of factors like system process scheduling interruption and system hardware on synchronous playing, thereby enhancing the precision of synchronous playing; moreover, upon arrival of the starting time point of synchronous playing, by computing a tuning amount of the audio data in the local synchronization buffer area, adjusting the audio data in the local synchronization
(Continued)

buffer area according to the tuning amount, and meanwhile performing output playing on the tuned audio data, the method achieves audio synchronization play. Compared with the prior art, the present invention needn't add playing timestamp information to an audio data stream, and the playing terminal needn't process timestamp information during the entire playing procedure, thereby effectively increasing the flexibility of synchronous playing.

10 Claims, 3 Drawing Sheets (51) Int. Cl.
*H04N 21/25* (2011.01)
*G11B 27/031* (2006.01)
*G11B 27/32* (2006.01)
*G06F 17/30* (2006.01)
*G06F 3/16* (2006.01)
*H04N 21/20* (2011.01)
*G11B 27/10* (2006.01)
*G11B 27/00* (2006.01)

(52) U.S. Cl.
CPC ............ *G11B 27/031* (2013.01); *G11B 27/10* (2013.01); *G11B 27/323* (2013.01); *H04N 21/20* (2013.01); *H04N 21/25* (2013.01); *H04N 21/26258* (2013.01); *G06F 17/30017* (2013.01); *G11B 27/002* (2013.01); *G11B 2020/10703* (2013.01); *G11B 2020/10768* (2013.01)

(58) Field of Classification Search
CPC . G06F 17/30044; G06F 3/165; G11B 27/002; G11B 27/031; G11B 27/10; G11B 27/323
USPC ............ 700/94; 710/52, 56, 57, 58; 711/110
See application file for complete search history.

(56) References Cited

U.S. PATENT DOCUMENTS

2008/0120429 A1* 5/2008 Millington .......... G06F 17/3074
 709/231
2013/0077699 A1 3/2013 Gifford et al.
2014/0132837 A1 5/2014 Ye et al.

FOREIGN PATENT DOCUMENTS

| CN | 103198851 | 7/2013 |
| CN | 103200461 | 7/2013 |
| CN | 103338204 | 10/2013 |
| CN | 104269182 | 1/2015 |

OTHER PUBLICATIONS

Written Opinion of the International Searching Authority from the State Intellectual Property Office of the P.R. China for International Application No. PCT/CN2015089042, dated Dec. 16, 2015.

* cited by examiner

METHOD, APPARATUS AND SYSTEM FOR PLAYING AUDIO SYNCHRONOUSLY

FIELD OF THE INVENTION

The present invention relates to audio technologies in the communication field, and more specifically to a method, apparatus and system for playing audio synchronously.

BACKGROUND OF THE INVENTION

With the development of electronic information technologies and acoustic technologies, multi-audio output terminal systems have been widely applied. This leads to an issue of synchronous playing between multiple audio output terminals.

An existing prevalent practice of playing audio synchronously is adding playing timestamp information to an audio data stream. After obtaining the audio stream data and timestamp information, audio output terminals output corresponding audio data at a corresponding time point, thereby achieving an objective of synchronous playing between the multiple audio output terminals. However, this existing prevalent method at least has the following drawbacks:

First, an audio source needs to be processed in order to add timestamp information, which has a low universality and lacks flexibility; second, the audio output terminals are required to analyze the timestamp information during the entire playing procedure so as to output the audio data at a corresponding time point, which increases system complexity; finally, if the audio output terminals support, multi-path audio concurrent output (synchronous channel and asynchronous channel), i.e., the audio output terminals contain a mixer, the synchronization operation for synchronous playing has to be completed before mixing (the synchronous channel does not affect the asynchronous channel); and if the sampling rate of an audio data source does not match that of audio data playing hardware, the synchronization operation for the synchronous playing needs to be completed before audio re-sample.

All of the drawbacks above will introduce system complexity and cause poor synchronization precision; besides, on an audio output terminal containing an operating system, control of the synchronization precision becomes even more complex due to randomness of system scheduling and system interruption.

SUMMARY OF THE INVENTION

The present invention provides a method, apparatus, and system for playing audio synchronously to solve the existing problems of poor flexibility of audio synchronization, high system complexity, and low precision of audio synchronization play.

In order to achieve the above objectives, the technical solution of the present invention is implemented as such:

In one aspect, one embodiment of the present invention provides a method for playing audio synchronously, the method comprising:

transmitting, by a server side, an audio data source path and a prefetching command to each client;

obtaining, by each client, audio data from the audio data source path according to the prefetching command, decoding the obtained audio data and buffering the decoded data into a local synchronization buffer area, and after buffering to a prefetching threshold in the local synchronization buffer area, transmitting a prefetching-completed response and prefetching-completed time to the server side;

determining, by the server side after receiving the prefetching-completed responses from all clients, a starting time point of synchronous playing according to the prefetching-completed time of all clients, and transmitting a synchronous playing command and the starting time point of synchronous playing to each client;

judging, by each client alter receiving the synchronous playing command, whether the starting time point of synchronous playing has arrived, and using designated data to perform output operation before arrival of the starting time point of synchronous playing; upon arrival of the starting time point of synchronous playing, computing a tuning amount of the audio data in the local synchronization buffer area, tuning audio data in the local synchronization buffer area according to the tuning amount, and meanwhile performing output playing on the tuned audio data.

wherein the audio data source path includes an externally accessible address of a server per se, or an externally accessible address of other device than the server in a network.

In the technical solution above, the server side selects a time point after all clients have completed prefetching as the starting time point of synchronous playing.

In the technical solution above, the judging, by each client after receiving the synchronous playing command, whether the starting time point of synchronous playing has arrived comprises:

comparing, by each client, local current system time with the starting time point of synchronous playing at a predetermined time interval; if the local current system time is later than or equal to the starting time point of synchronous playing, judging that the starting time point of synchronous playing arrives; otherwise, judging that the starting time point of synchronous playing has not arrived yet.

In the technical solution above, the output operation is performed using designated data 0 before arrival of the starting time point of synchronous playing.

In the technical solution above, the upon arrival of the starting time point of synchronous playing, computing, by each client, a tuning amount of the audio data in the local synchronization buffer area comprises:

computing, by the client, an audio data amount that needs to be discarded or a designated data amount that needs to be interpolated in the local synchronization buffer area according to an audio data amount already contained in current audio output link obtained upon arrival of the starting time point of synchronous playing, system time of obtaining this audio data amount, the starting time point of synchronous playing, an output sampling rate of the client, and a sampling rate of an audio data source.

Optionally, the tuning, by each client, audio data in the local synchronization buffer area according to the tuning amount comprises:

performing, by each client, a discarding operation to the audio data in the local synchronization buffer area, and when the output sampling rate of the client is consistent with the sampling rate of the audio data source, computing the audio data amount that needs to be discarded in the local synchronization buffer area using the following equation:

$$\text{Frames}=((\text{New}Ns-\text{Start}NS)*Hw\text{Rate})/10^9+\text{BufferFrames};$$

when the output sampling rate of the client is inconsistent with the sampling rate of the audio data source, computing the audio data amount that needs to be discarded in the local synchronization buffer area using the following equation:

$$Frames=((NewNs-StartNS)*SrcRate)/10^9+(BufferFrames*SrcRate)/HwRate;$$

or, performing, by each client, an interpolating operation on the audio data in the local synchronization buffer area, and computing the designated data amount that needs to be interpolated in the local synchronization buffer area using the following equation:

$$Frames=Magic-(((NewNs-StartNS)*HwRate)/10^9+BufferFrames);$$

Wherein, Frames denotes a result from the computing, NewNs denotes system time when obtaining BufferFrames data, StartNs denotes a starting time point of synchronous playing, HwRate denotes an output sampling rate of the client, SrcRate denotes a sampling rate of the audio data source, BufferFrames denotes an audio data amount already contained in the current audio output link obtained when the client judges that the starting time point StartNs of synchronous playing arrives, and Magic and denotes a constant.

On the other hand, another embodiment of the present invention provides an apparatus for playing audio synchronously, comprising: a synchronizing unit, a synchronization buffer area, a designated data buffer area, and an audio output unit; wherein:

the synchronization buffer area is configured to buffer audio data that are obtained from an audio data source and need to be played;

the designated data buffer area is configured to buffer audio data of a designated value;

the audio output unit is configured to perform output playing on the audio data;

the synchronizing unit is configured to receive an audio data source path and a prefetching command transmitted from a server side, obtain audio data that need to be played from the audio data source path according to the prefetching command, decode the obtained audio data and buffer the decoded data into the synchronization buffer area, and after buffering to a prefetching threshold in the synchronization buffer area, transmit a prefetching-completed response and prefetching-completed time to the server side; and receive a synchronous playing command and a starting time point of synchronous playing transmitted by the server side; judge, after receiving the synchronous playing command, whether the starting time point of synchronous playing has arrived; output the audio data in the designated data buffer area to the audio output unit before arrival of the starting time point of synchronous playing; compute, upon arrival of the starting time point of synchronous playing, a tuning amount of the audio data in the synchronization buffer area, tune audio data in the local synchronization buffer area according to the tuning amount, and meanwhile output the tuned audio data in the synchronization buffer area to the audio output unit.

In another aspect, a further embodiment of the present invention provides a system for playing audio synchronously, the system comprising: a server side, one or more clients used as audio playing terminals, the server interacting with the one or more clients to perform synchronous playing, wherein:

the server side is configured to transmit an audio data source path and a prefetching command to each client; and after receiving prefetching-completed responses from all clients, determine a starting time point of synchronous playing according to prefetching-completed time of all clients, and transmit a synchronous playing command and the starting time point of synchronous playing to each client;

the client comprises an apparatus for playing audio synchronously as mentioned above.

The embodiments of the present invention at least have the following beneficial effects:

Compared with the prior art, the method, apparatus, and system for playing audio synchronously are not based on a timestamp, such that it is not needed to add playing timestamp information to an audio data stream, and the playing terminal needn't process timestamp information during the entire playing procedure, thereby effectively reducing the complexity of synchronous playing and increasing the flexibility of synchronous playing.

Moreover, the embodiments of the present invention completes initialization and establishment of an audio link by outputting designated data before arrival of the starting time point of synchronous playing, such that the audio link is already in a stabilized state upon arrival of the starting time point of synchronous playing; the embodiments peel off the factors affecting the precision of synchronous playing by computing a tuning amount of the audio data in the synchronization buffer area upon arrival of the starting time point of synchronous playing, tuning audio data in the local synchronization buffer area based on the tuning amount, and meanwhile performing output playing on the tuned audio data, such that the precision of synchronous playing is more controllable, which effectively shuns from the impact of factors like system process scheduling, interruption and system hardware on synchronous playing, thereby enhancing the precision of synchronous playing.

BRIEF DESCRIPTION OF THE ACCOMPANYING DRAWINGS

The accompanying drawings, which provide further understanding of the present invention and constitute part of the specification, are used, together with the embodiments of the present invention, for explaining the present invention, rather than limiting the present invention. In the accompanying drawings.

DETAILED DESCRIPTION OF THE PREFERRED EMBODIMENTS

In order to make the objectives, technical solutions and advantages of the present invention more apparent, the embodiments of the present invention will be described in further detail with reference to the accompanying drawings.

Figure 1:
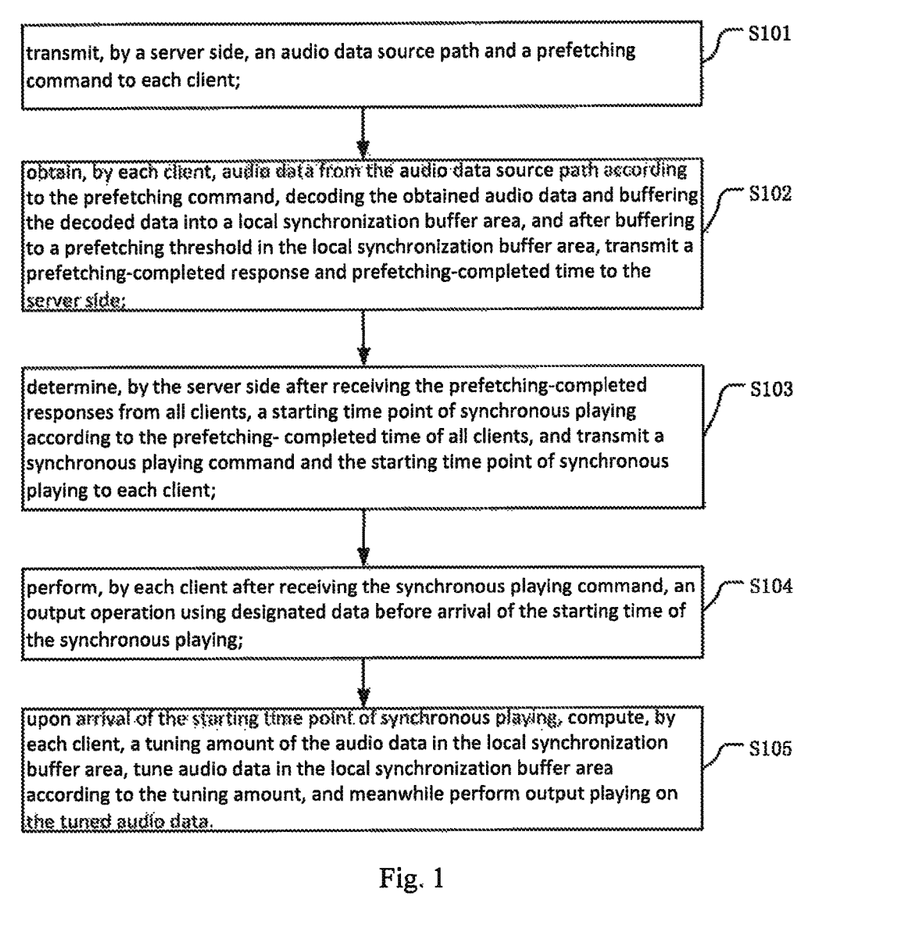
FIG. 1 illustrates a flow diagram of a method for playing audio synchronously according to an embodiment of the present invention.

FIG. 1 illustrates a flow diagram of a method for playing audio synchronously according to an embodiment of the present invention, the method comprising:

S101: transmitting, by a server side, an audio data source path and a prefetching command to each client.

Specifically, the audio data source path includes an externally accessible address of the server per se, or an externally accessible address of other device than the server in a network, typically for example a network address. That is, the audio data provided by the audio data source path may be local audio data in the server side or audio data in other device in the network.

S102: obtaining, by each client, audio data that need to be played from the audio data source path according to the prefetching command, decoding the obtained audio data and buffering the decoded data into a local synchronization buffer area, and after buffering to a prefetching threshold in the local synchronization buffer area, transmitting a prefetching-completed response and prefetching-completed time to the server side.

In actual applications, the prefetching threshold is determined according to actual situations, which is generally associated with an application scenario and an audio communication system platform; for example, when the transmission rates of the clients and the server side are relatively low, a larger prefetching threshold is set to ensure no audio interruption due to transmission delay, thereby guaranteeing continuity of audio output.

S103: determining, by the server side after receiving the prefetching-completed responses from all clients (all clients that need audio synchronization), a starting time point of synchronous playing according to the prefetching-completed time of all clients, and transmitting a synchronous playing command and the starting time point of synchronous playing to each client.

After receiving the prefetching-completed responses from the clients, the server side judges whether all clients have completed the prefetching; when all clients have completed the prefetching, the server side obtains the starting time StartNs of the synchronous playing based on the prefetching-completed time of all clients, and transmits, to each client, a synchronous playing command and the starting time point StartNs of the synchronous playing.

It should be noted that the starting time StartNs of the synchronous playing is a time point after all clients have completed prefetching, e.g., the $5^{th}$ second after all clients have completed prefetching. Computation of the StartNs should be determined based on the actual conditions.

S104: performing, by each client, an output operation using designated data after having received the synchronous playing command and before arrival of the starting time of the synchronous playing.

Optionally, each client judges whether the starting time point of synchronous playing arrives using the following method: respective clients compare their local current system time with the starting time point of synchronous playing at a predetermined time interval; if the local current system time is later than or equal to the starting time point of synchronous playing, judge that the starting time point of synchronous playing arrives; otherwise, judge that the starting time point of synchronous playing has not arrived yet.

It should be noted that judging whether the starting time point of synchronous playing has arrived is not limited to the above solution, because the above solution is platform dependent. On a platform without an operating system, a hardware timer may be set, which judges whether the starting time point of synchronous playing has arrived; while on a platform with an operating system, it may be implemented using a software timer manner. However, the precision of the software timer method is not high.

In one preferred embodiment, the output operation is performed using data 0 before arrival of the starting time point of synchronous playing. Of course, other designated data than 0 may also be adopted, e.g., 1, 2, etc., as long as the designated data will not produce a human ear-sensible sound.

It should also be noted that the initialization and establishment of the audio link are affected by factors such as process scheduling and interruption of the client system and system hardware, such that time for respective clients to complete audio link initialization and establishment is inconsistent. The present embodiment performs an output operation using designated data (e.g., data 0) before arrival of the starting time point of synchronous playing to complete audio link initialization and establishment, such that the entire audio link is already in a stable state when the audio data in the local synchronization buffer area starts being played, i.e., the playing buffer area in the audio link is in a stable state. At this time, the audio hardware can obtain data from the playing buffer area according to its own sampling rate, while the client may fill in data into the playing buffer area in its own step; besides, the stabilized process of the audio link initialization and establishment will not be sensible to human ears, thereby providing a good user experience to the user.

S105: upon arrival of the starting time point of synchronous playing, computing, by each client, a tuning amount of the audio data in the local synchronization buffer area, tuning audio data in the local synchronization buffer area according to the tuning amount, and meanwhile performing output playing on the tuned audio data.

Specifically, the client computes an audio data amount that needs to be discarded or a designated data amount that needs to be interpolated in the local synchronization buffer area according to an audio data amount already contained in the current audio output link obtained upon arrival of the starting time point of synchronous playing, system time of obtaining this audio data amount, the starting time point of synchronous playing, an output sampling rate of the client, and a sampling rate of the audio data source.

An optional solution is that respective clients tune the audio data in their local synchronization buffer areas by uniformly performing a discarding operation to the audio data in the local synchronization buffer area, wherein:

when the output sampling rate of the client is consistent with the sampling rate of the audio data source, the audio data amount that needs to be discarded in the local synchronization buffer area is computed using the following equation:

$$\text{Frames} = ((\text{New}Ns - \text{Start}NS) * Hw\text{Rate})/10^9 + \text{BufferFrames}$$

Or, when the output sampling rate of the client is inconsistent with the sampling rate of the audio data source, the audio data amount that needs to be discarded in the local synchronization buffer area is computed using the following equation:

$$\text{Frames} = ((\text{New}Ns - \text{Start}NS) * Src\text{Rate})/10^9 + (\text{BufferFrames} * Src\text{Rate})/Hw\text{Rate}$$

In this solution, the client will discard a data amount of Frames size from the initial data in the audio data already stored in the local synchronization buffer area. The initial data refers to the first data in the playing sequence of audio data.

Another optional solution is that when the clients do not want to discard audio data, respective clients may tune the audio data in their local synchronization buffer areas by uniformly performing an interpolation operation to the audio data in the local synchronization buffer area, wherein a designated data amount that needs to be interpolated in the local synchronization buffer area may be computed using the following equation:

$$\text{Frames}=\text{Magic}-(((\text{New}Ns-\text{Start}NS)*Hw\text{Rate})/10^9+\text{BufferFrames}).$$

In this solution, the client add a data amount of Frames size before the initial data in the audio data already stored in the local synchronization buffer area. The initial data refers to the first data in the playing sequence of audio data.

In the above equation, Frames denotes a result from the computing, NewNs denotes system time when obtaining BufferFrames data, StartNs denotes a starting time point of synchronous playing, HwRate denotes an output sampling rate of the client, SrcRate denotes a sampling rate of the audio data source, BufferFrames denotes audio data amount already contained in the current audio output link obtained when the client judges that the starting time point StartNs of the synchronous playing arrives, and Magic denotes a constant.

It should be noted that the operation of performing output playing to the audio data comprises:

In a system having a mixer, respective clients first output audio data in the local synchronization buffer areas into the mixer, and then output them into a playing buffer area after mix is done, and finally an audio output unit performs the output play; or, In a system without a mixer, respective clients directly output the audio data in the local synchronization buffer areas into the playing buffer area, and then the audio output unit performs output play; or, Each client directly performs output playing of the audio data in the local synchronization buffer area by an audio output unit.

It should also be noted that the data output operation here refers to outputting a segment of audio data to a target module, and after waiting for a period of time (sleep or performing other operations), then outputting a next segment of audio data to the target module, the size of a segment of audio data and the length of waiting time duration being dependent on a specific platform.

In view of the above, the solution of the present embodiment may be applied onto an audio output terminal having an operating system or a mixer, which can effectively shun from the impacts on synchronous playing due to process scheduling and interruption of the operating system. The audio link initialization and establishment is completed by starting output of designated data before arrival of the playing time, such that the audio link is already in a stable state upon arrival of the playing time. Moreover, when outputting valid audio data in the synchronization buffer area, the data amount size that needs to be discarded or interpolated is determined through computation so as to playing audio synchronously. The present solution minimizes the impact on synchronization operations due to factors such as process scheduling and interruption and system hardware platform and improves the precision of synchronous playing.

Figure 2:
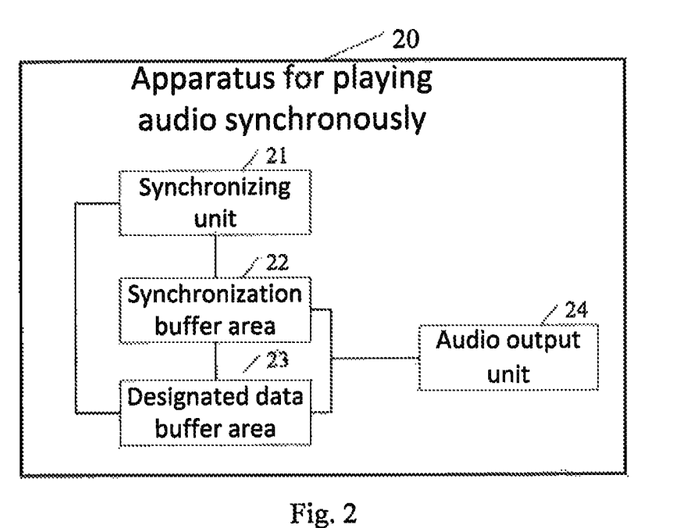
FIG. 2 illustrates a structural diagram of an apparatus for playing audio synchronously according to an embodiment of the present invention.

FIG. 2 illustrates a structural diagram of an apparatus for playing audio synchronously according to an embodiment of the present invention. The apparatus 20 for playing audio synchronously, comprising: a synchronizing unit 21, a synchronization buffer area 22, a designated data buffer area 23, and an audio output unit 24; wherein:

the synchronization buffer area 22 is configured to buffer audio data that are obtained from an audio data source and need to be played;

the designated data buffer area 23 is configured to buffer audio data of a designated value;

the audio output unit 24 is configured to perform output playing on the audio data;

the synchronizing unit 21 is configured to receive an audio data source path and a prefetching command transmitted from a server side, obtain audio data that need to be played from the audio data source path according to the prefetching command, decode the obtained audio data and buffer the decoded data into the synchronization buffer area 22, and after buffering to a prefetching threshold in the synchronization buffer area 22, transmit a prefetching-completed response and prefetching-completed time to the server side; and receive a synchronous playing command and a starting time point of synchronous playing transmitted by the server side; judge, after receiving the synchronous playing command, whether the starting time point of synchronous playing has arrived; output the audio data in the designated data buffer area 23 to the audio output unit 24 before arrival of the starting time point of synchronous playing; compute, upon arrival of the starting time point of synchronous playing, a tuning amount of the audio data in the synchronization buffer area 22, tune audio data in the local synchronization buffer area 22 according to the tuning amount, and meanwhile output the tuned audio data in the synchronization buffer area 22 to the audio output unit 24.

Preferably, the synchronizing unit 21 performs an output operation using designated data 0 before arrival of the starting time point of synchronous playing.

In one embodiment, the synchronizing unit 21 compares a local current system time with the starting time point of synchronous playing at a predetermined time interval; if the local current system time is later than or equal to the starting time point of synchronous playing, judges that the starting time point of synchronous playing arrives; otherwise, judges that the starting time point of synchronous playing has not arrived yet.

In one preferred embodiment, the apparatus 20 far playing audio synchronously further comprises:

a mixer for mixing audio data in the synchronization buffer area or designated data buffer area with output of audio data from other audio modules; and/or, a playing buffer area for buffering audio data outputted from the mixer, or the synchronization buffer area or the designated data buffer area.

It should be noted that in a system having a mixer, the data is first outputted into the mixer, and then outputted into the playing buffer area after mix is done; in a system without a mixer, the data are directly outputted into the playing buffer area, such that the audio output unit 24 reads audio data from the playing buffer area to output playing. Additionally, in a simple playing system, the audio data may be directly outputted to the audio output unit 24 for play.

In another embodiment, the synchronizing unit 21 specifically computes an audio data amount that needs to be discarded or a designated data amount that needs to be interpolated in the local synchronization buffer area according to an audio data amount already contained in the current audio output link obtained upon arrival of the starting time point of synchronous playing, system time of obtaining this audio data amount, the starting time point of synchronous playing, an output sampling rate of the client, and a sampling rate of the audio data source.

Preferably, the synchronizing unit 21 may comprise a first computing module, a second computing module or a third computing module.

The first computing module is configured to compute the audio data amount that needs to be discarded in the local synchronization buffer area using the following equation when the output sampling rate of the client is consistent with the sampling rate of the audio data source:

Frames=((New$Ns$−Start$NS$)*$Hw$Rate)/$10^9$+BufferFrames;

The second computing module is configured to compute the audio data amount that needs to be discarded in the local synchronization buffer area using the following equation when the output sampling rate of the client is inconsistent with the sampling rate of the audio data source:

Frames=((New$Ns$−Start$NS$)*$Src$Rate)/$10^9$+ (BufferFrames*$Src$Rate)/$Hw$Rate;

The third computing unit is configured to compute a designated data amount that needs to be interpolated in the local synchronization buffer areas using the following equation, when the client does not want to discard audio data:

Frames=Magic−((New$Ns$−Start$NS$)*$Hw$Rate)/$10^9$+ BufferFrames);

wherein, Frames denotes a result from the computing, NewNs denotes system time when obtaining BufferFrames data, StartNs denotes a starting time point of synchronous playing, HwRate denotes an output sampling rate of the client, SrcRate denotes a sampling rate of the audio data source, BufferFrames denotes an audio data amount already contained in the current audio output link obtained when the client judges that the starting time point StartNs of the synchronous playing arrives, and Magic denotes a constant obtained from experience, which is to avoid discarding audio data.

It should be noted that BufferFrames refers to the audio data amount already contained in the audio path at the NewNs time, i.e., the data that are outputted by the synchronizing unit 21 but have not been finally outputted by the audio hardware; wherein values of BufferFrames and NewNs may be obtained through programming.

Figure 3:
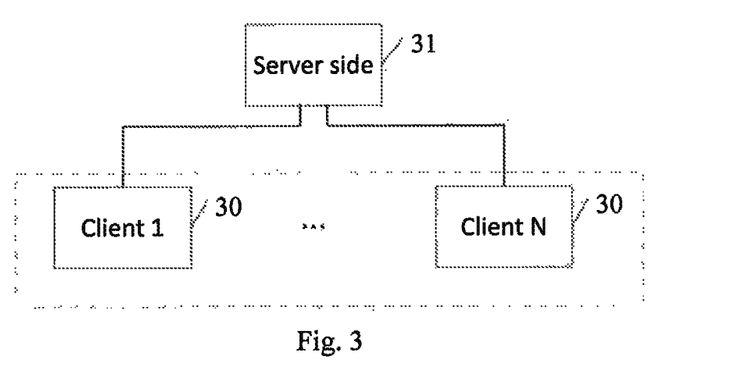
FIG. 3 illustrates a structural diagram of a system for playing audio synchronously according to an embodiment of the present invention.

FIG. 3 illustrates a composition diagram of a system for playing audio synchronously according to an embodiment of the present invention, the system comprising: a server side 31, N clients 30 used as audio playing terminals, the server side 31 interacting with the N clients 30 to perform synchronous playing, N being a positive integer greater than or equal to 1, wherein:

the server side 31 is configured to transmit an audio data source path and a prefetching command to each client 30; and after receiving prefetching completed responses from all clients 30, determine a starting time point of synchronous playing according to prefetching-completed time of all clients 30, and transmit a synchronous playing command and the starting time point of synchronous playing to each client 30;

the client 30 comprises respective units and modules in the apparatus 20 for playing audio synchronously.

In the embodiment above, the audio data source path provided by the server side 31 may be a local path, or other network path; at this point, it is only needed to guarantee that respective clients that need audio synchronization in the entire system can all access to the network.

In the embodiment above, the server side 31 selects a time point after all clients complete prefetching as a starting time point of synchronous playing.

In one preferred embodiment, the server side 31 may be provided an audio playing and synchronization function of the client 30, such that the server may be used as an audio playing terminal. At this time, the server side 31 also acts as a playing terminal while providing an audio data source path.

Specific work manners of respective units in the apparatus and system embodiments of the present invention may refer to relevant contents in the method embodiments of the present invention, which will not be detailed here.

Figure 4:
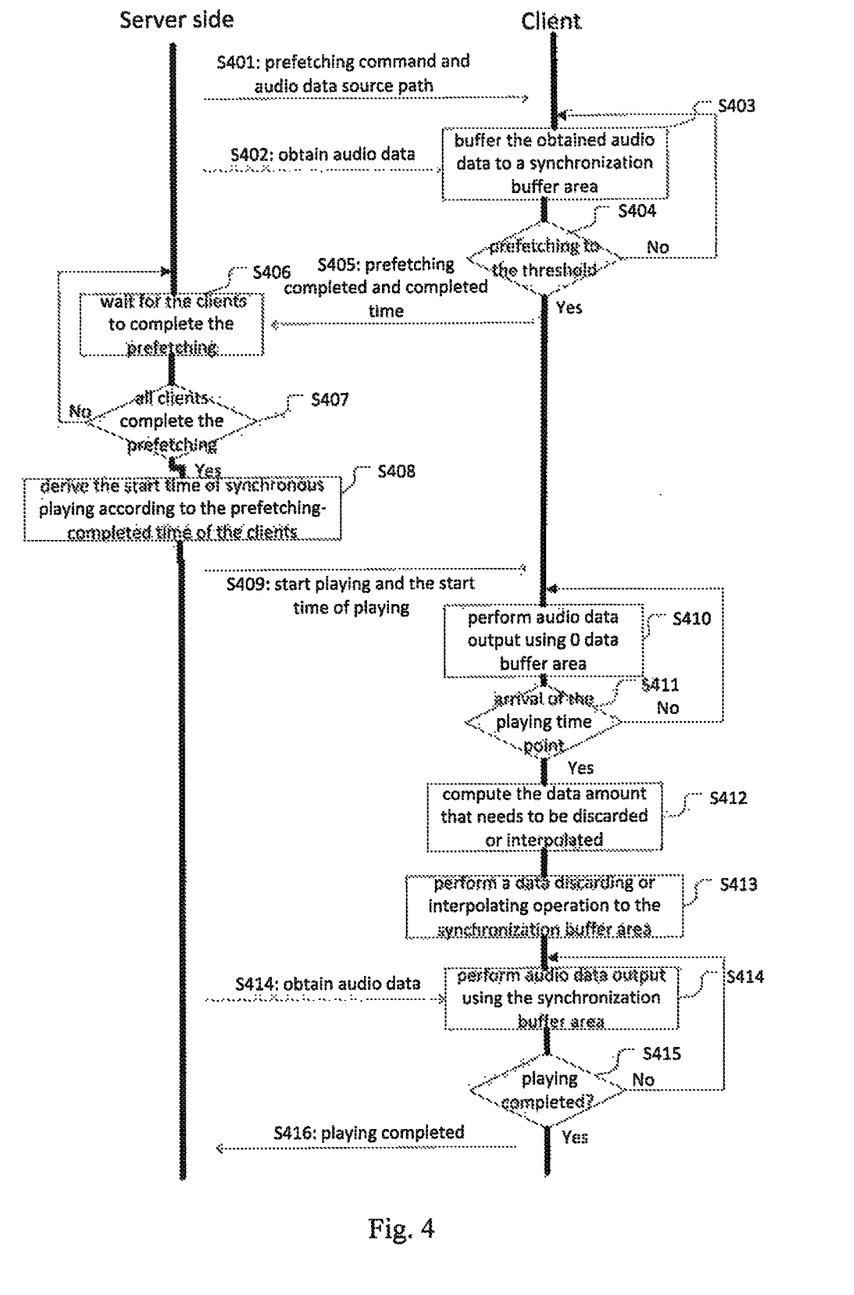
FIG. 4 illustrates an operation procedure schematic diagram of a system for playing audio synchronously according to an embodiment of the present invention.

FIG. 4 illustrates an operation procedure schematic diagram of a system for playing audio synchronously according to an embodiment of the present invention. The operation procedure comprises:

S401: the server side transmits an audio data source path and a prefetching command to respective clients.

Wherein, the audio data source path may be an externally accessible address of the server per se or an externally accessible address of other device in a network.

S402: each client obtains audio data from the audio data source path according to the prefetching command.

S403: each client decodes the obtained audio data and buffers the decoded data into a local synchronization buffer area.

S404: each client judges whether the local synchronization area has buffered to a prefetching threshold; if not, return to step S403 to continue buffering; if yes, jump to S405.

S405: each client transmits a prefetching-completed response and prefetching-completed time to the server side.

S406: the server side waits for the clients to complete the prefetching.

S407: the server side judges whether all clients have completed prefetching; if not, return to S406 to continue waiting and receiving the prefetching-completed responses and prefetching completed time transmitted by the clients; if yes, jump to S408.

S408: the server side determines a starting time point of a synchronous playing according to the prefetching-completed time of all clients.

S409: the server side transmits a synchronous playing command and a starting time point of synchronous playing to respective clients.

S410: after receiving the synchronous playing command, respective clients perform an output operation using data 0 before arrival of the starting time point of synchronous playing.

S411: respective clients compare the obtained system current time with the starting time point of synchronous playing at a predetermined time interval, and judge whether the starting time point of synchronous playing has arrived; if not, return to S410 to continue using data 0 to perform an output operation; if yes, jump to S412.

S412: each client computes an audio data amount that needs to be discarded or the size of data 0 that needs to be interpolated in the local synchronization buffer area.

S413: each client performs a data discarding or interpolating operation to the local synchronization buffer area based on a result of the computing.

S414: each client performs an output operation to the audio data in the local synchronization buffer area; and meanwhile obtains, uninterruptedly from the audio data source path, audio data, decodes them and buffers the decoded data in the local synchronization buffer area.

It should be noted that once the audio data in the local synchronization buffer area starts being outputted, the client will start uninterruptedly the operation of obtaining the audio data from the audio data source path, decoding them and buffering the decoded data into the local synchronization buffer area. The operation will be continuously performed from S402.

S415: each client judges whether the playing has been completed; if the playing has not been completed, returns to S414 to continue the output operation to the audio data in the local synchronization buffer area; if the playing has been completed, jumps to step S416.

Wherein, whether the playing has been completed may be determined by judging a state in the synchronization buffer area; if the synchronization buffer area has no data for a long time, it is believed that the playing has been completed. However, the present invention is not limited to this method.

S416: each client transmit a play-completed response to the server side.

In view of the above, compared with the prior art, the method, apparatus, and system for playing audio synchronously disclosed by the embodiments of the present invention are not based on a timestamp, such that it is not needed to add playing timestamp information to an audio data stream, and the playing terminal needn't process timestamp information during the entire playing procedure, thereby effectively reducing the complexity of synchronous playing and increasing the flexibility of synchronous playing.

Moreover, the embodiments of the present invention completes initialization and establishment of an audio link by outputting designated data before arrival of the starting time point of synchronous playing, such that the audio link is already in a stabilized state upon arrival of the starting time point of synchronous playing; the embodiments peel off the factors affecting the precision of synchronous playing by computing a tuning amount of the audio data in the synchronization buffer area upon arrival of the starting time point of synchronous playing, tuning audio data in the local synchronization buffer area based on the tuning amount, and meanwhile performing output playing on the tuned audio data, such that the precision of synchronous playing is more controllable, which effectively shuns from the impact of factors like system process scheduling, interruption and system hardware on synchronous playing, thereby enhancing the precision of synchronous playing.

What are mentioned above are only preferred embodiments of the present invention, not intended to limit the protection scope of the present invention. Any modifications, equivalent substitutions and improvements within the spirit and principle of the present invention should be included within the protection scope of the present invention.

The invention claimed is:

1. A method for playing audio synchronously without adding playing timestamp information to audio data, the method comprising:
    transmitting, by a server side, an audio data source path and a prefetching command to each client;
    obtaining, by each client, audio data that need to be played from the audio data source path according to the prefetching command, decoding the obtained audio data and buffering the decoded data into a local synchronization buffer area, and after buffering to a prefetching threshold in the local synchronization buffer area, transmitting a prefetching-completed response and prefetching-completed time to the server side;
    determining, by the server side after receiving the prefetching-completed responses from all clients, a starting time point of synchronous playing according to the prefetching-completed time of all clients, and transmitting a synchronous playing command and the starting time point of the synchronous playing to each client;
    judging, by each client after receiving the synchronous playing command, whether the starting time point of the synchronous playing has arrived, and using designated data to perform an output operation before arrival of the starting time point of the synchronous playing; and
    upon arrival of the starting time point of the synchronous playing, computing a tuning amount of the audio data in the local synchronization buffer area, tuning audio data in the local synchronization buffer area according to the tuning amount, and meanwhile performing output playing on the tuned audio data.

2. The method according to claim 1, wherein the audio data source path includes an externally accessible address of a server per se, or an externally accessible address of a device other than the server in a network.

3. The method according to claim 1, wherein determining the starting time point of the synchronous playing according to the prefetching-completed time of all clients comprises:
    selecting, by the server side, a time point after all clients have completed prefetching as the starting time point of the synchronous playing.

4. The method according to claim 1, wherein judging whether the starting time point of the synchronous playing has arrived comprises:
    comparing, by each client at a predetermined time interval, local current system time with the starting time point of the synchronous playing;
    if the local current system time is later than or equal to the starting time point of the synchronous playing, judging that the starting time point of the synchronous playing arrives;
    otherwise, judging that the starting time point of the synchronous playing has not arrived yet.

5. The method according to claim 1, wherein the output operation is performed using data 0 before arrival of the starting time point of the synchronous playing.

6. The method according to claim 1, wherein computing the tuning amount of the audio data in the local synchronization buffer area comprises:
    computing, by the client, an audio data amount that needs to be discarded or a designated data amount that needs to be interpolated in the local synchronization buffer area according to an audio data amount already contained in current audio output link obtained upon arrival of the starting time point of the synchronous playing, system time of obtaining the audio data amount, the starting time point of the synchronous playing, an output sampling rate of the client, and a sampling rate of an audio data source.

7. The method according to claim 6, wherein the tuning, by each client, audio data in the local synchronization buffer area according to the tuning amount comprises:
    performing, by each client, a discarding operation to the audio data in the local synchronization buffer area, and
    a) when the output sampling rate of the client is consistent with the sampling rate of the audio data source, computing the audio data amount that needs to be discarded in the local synchronization buffer area using the following equation:

$$\text{Frames} = ((\text{New}Ns - \text{Start}NS) * Hw\text{Rate})/10^9 + \text{BufferFrames};$$

b) when the output sampling rate of the client is inconsistent with the sampling rate of the audio data source, computing the audio data amount that needs to be discarded in the local synchronization buffer area using the following equation:

$$\text{Frames} = ((\text{New}Ns - \text{Start}NS) * SrcRate)/10^9 + (\text{BufferFrames} * SrcRate)/HwRate;$$

or, performing, by each client, an interpolating operation on the audio data in the local synchronization buffer area, and computing the designated data amount that needs to be interpolated in the local synchronization buffer area using the following equation:

$$\text{Frames} = \text{Magic} - (((\text{New}Ns - \text{Start}NS) * HwRate)/10^9 + \text{BufferFrames});$$

wherein, Frames denotes a result from the computing, New-Ns denotes system time when obtaining Buffer-Frames data, StartNs denotes a starting time period of the synchronous playing, HwRate denotes an output sampling rate of the client, SrcRate denotes a sampling rate of the audio data source, BufferFrames denotes an audio data amount already contained in the current audio output link obtained when the client judges that the starting time point StartNs of the synchronous playing arrives, and Magic denotes a constant.

8. An apparatus for playing audio synchronously without using playing timestamp information added to audio data, the apparatus comprising:

a synchronizing unit, a synchronization buffer area, a designated data buffer area, and an audio output unit; wherein:

the synchronization buffer area is configured to buffer audio data that are obtained from an audio data source and need to be played;

the designated data buffer area is configured to buffer audio data of a designated value;

the audio output unit is configured to perform output playing on the audio data;

the synchronizing unit is configured to receive an audio data source path and a prefetching command transmitted from a server side, obtain audio data that need to be played from the audio data source path according to the prefetching command, decode the obtained audio data and buffer the decoded data into the synchronization buffer area, and after buffering to a prefetching threshold in the synchronization buffer area, transmit a prefetching-completed response and prefetching-completed time to the server side; and receive a synchronous playing command and a starting time point of synchronous playing transmitted by the server side; judge, after receiving the synchronous playing command, whether the starting time point of the synchronous playing has arrived; output the audio data in the designated data buffer area to the audio output unit before arrival of the starting time point of the synchronous playing; compute, upon arrival of the starting time point of the synchronous playing, a tuning amount of the audio data in the synchronization buffer area, tune audio data in the local synchronization buffer area according to the tuning amount, and meanwhile output the tuned audio data in the synchronization buffer area to the audio output unit.

9. The apparatus for playing audio synchronously according to claim 8, wherein the synchronizing unit comprises a first computing module, a second computing module or a third computing module, wherein the first computing module is configured to compute the audio data amount that needs to be discarded in the local synchronization buffer area using the following equation when an output sampling rate of a client is consistent with a sampling rate of the audio data source:

$$\text{Frames} = ((\text{New}Ns - \text{Start}NS) * HwRate)/10^9 + \text{BufferFrames};$$

the second computing module is configured to compute the audio data amount that needs to be discarded in the local synchronization buffer area using the following equation when the output sampling rate of the client is inconsistent with the sampling rate of the audio data source:

$$\text{Frames} = ((\text{New}Ns - \text{Start}NS) * SrcRate)/10^9 + (\text{BufferFrames} * SrcRate)/HwRate;$$

the third computing unit is configured to compute a designated data amount that needs to be interpolated in the local synchronization buffer area using the following equation:

$$\text{Frames} = \text{Magic} - (((\text{New}Ns - \text{Start}NS) * HwRate)/10^9 + \text{BufferFrames});$$

wherein, Frames denotes a result from the computing, NewNs denotes system time when obtaining Buffer-Frames data, StartNs denotes a starting time point of the synchronous playing, HwRate denotes an output sampling rate of the client, SrcRate denotes a sampling rate of the audio data source, BufferFrames denotes an audio data amount already contained in the current audio output link obtained when the client judges that the starting time point StartNs of the synchronous playing arrives, and Magic denotes a constant.

10. A system for playing audio synchronously without using playing timestamp information added to audio data, the system comprising:

a server side and one or more clients used as audio playing terminals, the server side interacting with the one or more clients to perform the synchronous playing, wherein:

the client comprises an apparatus for playing audio synchronously according to claim 8, the server side is configured to transmit the audio data source path and the prefetching command to each client; and after receiving prefetching-completed responses from all clients, determine the starting time point of the synchronous playing according to prefetching-completed time of all clients, and transmit the synchronous playing command and the starting time point of the synchronous playing to each client.

* * * * *